(12) United States Patent
Stadler

(10) Patent No.: US 10,981,613 B2
(45) Date of Patent: Apr. 20, 2021

(54) CONVEYOR DEVICE FOR AN AUTOMATED PRODUCTION LINE, COMPONENT CARRIER CARRIAGE FOR A CONVEYOR DEVICE, AND METHOD FOR OPERATING A CONVEYOR DEVICE

(71) Applicant: EBZ Systec GmbH, Ravensburg (DE)

(72) Inventor: Rainer Stadler, Rast (DE)

(73) Assignee: EBZ Systec GmbH, Ravensburg (DE)

( * ) Notice: Subject to any disclaimer, the term of this patent is extended or adjusted under 35 U.S.C. 154(b) by 0 days.

(21) Appl. No.: 16/595,842

(22) Filed: Oct. 8, 2019

(65) Prior Publication Data

US 2020/0070909 A1    Mar. 5, 2020

Related U.S. Application Data

(63) Continuation of application No. PCT/EP2018/059119, filed on Apr. 10, 2018.

(30) Foreign Application Priority Data

Apr. 11, 2017  (DE) .................... 10 2017 107 822.3

(51) Int. Cl.
*B62D 65/18*  (2006.01)
*B65G 35/06*  (2006.01)

(52) U.S. Cl.
CPC ............. *B62D 65/18* (2013.01); *B65G 35/06* (2013.01); *B65G 2201/0294* (2013.01)

(58) Field of Classification Search
CPC ........ B62D 65/00; B62D 65/18; B65G 35/06; B65G 2201/0294
See application file for complete search history.

(56) References Cited

U.S. PATENT DOCUMENTS 7,097,024 B2 *  8/2006  Swoboda ............... B62D 65/18
                                                      104/290
7,971,709 B2 *  7/2011  Krups ..................... B61B 13/12
                                                      198/867.13

(Continued)

FOREIGN PATENT DOCUMENTS

DE    20 2007 009 016 U1    12/2008
EP       2 560 861 B1        1/2014

(Continued)

OTHER PUBLICATIONS

International Search Report and Written Opinion (Application No. PCT/EP2018/059119) dated Sep. 18, 2018.

*Primary Examiner* — Gene O Crawford
*Assistant Examiner* — Keith R Campbell
(74) *Attorney, Agent, or Firm* — Burr & Brown, PLLC

(57) ABSTRACT

A conveyor device for an automated production line, including at least one conveyor track along a course of the production line, at least one component carrier carriage for transporting components or component assemblies on the production line, wherein the production line includes transfer portions and workstations that are run through by the conveyor track along the course of the production line. The conveyor track is configured as a monorail which extends along a central longitudinal axis of the component carrier carriage. The conveyor track includes a plurality of rollers which are driven at least in part by means of drives and the component carrier carriage includes at least one friction surface, by means of which the component carrier carriage is drivable by the rollers of the conveyor track, in particular is movable dynamically along the conveyor track.

20 Claims, 6 Drawing Sheets

(56) References Cited

U.S. PATENT DOCUMENTS

| | | | | |
|---|---|---|---|---|
| 9,045,183 B2* | 6/2015 | Laurence | ............... | B65G 17/12 |
| 9,688,478 B2* | 6/2017 | Robbin | ................. | B65G 35/06 |
| 10,124,958 B2* | 11/2018 | Robbin | ................. | B65G 39/18 |
| 2013/0062158 A1 | 3/2013 | Stadler et al. | | |
| 2018/0099681 A1 | 4/2018 | Riegraf et al. | | |
| 2020/0114384 A1* | 4/2020 | Schwab | ............. | B05B 13/0452 |

FOREIGN PATENT DOCUMENTS

| | | |
|---|---|---|
| FR | 2 567 831 A1 | 1/1986 |
| GB | 2 220 396 A | 1/1990 |
| WO | 2016/150543 A1 | 9/2016 |

\* cited by examiner

CONVEYOR DEVICE FOR AN AUTOMATED PRODUCTION LINE, COMPONENT CARRIER CARRIAGE FOR A CONVEYOR DEVICE, AND METHOD FOR OPERATING A CONVEYOR DEVICE

CROSS REFERENCE TO RELATED APPLICATIONS

This application is a continuation of International Application No. PCT/EP2018/059119 filed Apr. 10, 2018, which designated the United States, and claims the benefit under 35 USC § 119(a)-(d) of German Application No. 10 2017 107 822.3 filed Apr. 11, 2017, the entireties of which are incorporated herein by reference.

FIELD OF THE INVENTION

The present invention relates to a conveyor device for an automated production line, to a component carrier carriage for a conveyor device and to a method for operating a conveyor device.

BACKGROUND OF THE INVENTION

Conveyor devices and component carrier carriages are disclosed in the prior art, e.g. in WO 16/150543 A1 or EP 2 560 861 B1.

In particular, in the so-called carcass construction of the vehicle bodies the different body parts are connected together at multiple workstations by means of robots mostly by spot-welding or other connecting methods. The robots, in this case, are programmed such that they provide their connections at precisely defined coordinates in space. It is the job of a conveyor device, which provides the individual components or component assemblies at the workstations, to guide the components or component assemblies to the correct point in a precise manner, often to an accuracy of a fraction of a millimeter, such that the coordinates predefined for the robots and the position of the workpiece, produced from components or component assemblies, match in as precise a manner as possible. The positioning of the workpiece is effected, in this case, along three directions in space X, Y, Z, by a component carrier carriage being aligned as a component part of the conveyor device. The component carrier carriage moves, in this connection, into the workstation and must then be aligned along its direction of movement (X), transversely to the direction of movement (Y) and in the vertical direction (Z).

Considerable problems arise, as a rule, as a result of the, on the one hand, compact design in order to provide as much space as possible for the processing automatons, in particular, industrial robots, on the other hand as a result of the required precision during the positioning process in the individual workstations.

SUMMARY OF THE INVENTION

It is, consequently, the object of the present invention to improve the known conveyor devices with regard to their installation space and to the precise positioning.

The present invention consequently relates to a conveyor device for an automated production line comprising:
at least one conveyor track along a course of the production line,
at least one component carrier carriage for transporting components or component assemblies, in particular, car bodies, on the production line, and
wherein the production line includes transfer portions and workstations and these are run through by the conveyor track along the course of the production line.

The present invention is characterized in that the conveyor track is configured as a monorail, in a preferred manner a monorail which extends along a central longitudinal axis of the component carrier carriage and the conveyor track comprises a plurality of rollers which are driven at least in part by means of drives and that the component carrier carriage includes at least one friction surface, by means of which the component carrier carriage is drivable by the rollers of the conveyor track, in particular, is movable dynamically along the conveyor track.

As a result of the design as a monorail, which runs in a preferred manner along the longitudinal axis of a component carrier carriage and which defines the direction of a production line with its track direction, considerably less space is required for the design of the track so that there is more installation space for workstations, in particular, robots. The drive of the component carrier carriage by means of a friction surface by rollers from the conveyor track concentrates, in turn, drive technology in the conveyor track and provides the possibility of providing compact component carrier carriages with improved access possibilities for robots to the component or component assembly to be processed, in particular, the bodywork.

An advantageous further development of the conveyor device according to the present invention is characterized in that positioning members are provided on the component carrier carriage, and reference members are provided on the conveyor track at least in the region of a workstation, wherein the positioning members on the component carrier carriage and the reference members of the conveyor track interact in such a manner that the component carrier carriage is clearly positioned in a working position, in which the processing of the components or component assemblies is provided by at least one manipulator, relative to the workstation in one, preferably two, in particular, three directions in space.

The precise positioning of the component carrier carriage in the workstation allows the manipulators, in particular, the industrial robots, to head for precisely defined coordinates in order to fulfill processing tasks. The positioning in at least one, preferably in all three directions in space is effected as a result of interaction between positioning and reference members, which are, in particular, adjustable and can be adjusted at the workplace to the required tolerance in each workstation once the conveyor device has been assembled. Positioning surfaces or positioning blocks, which move against reference rollers on one or two contact surfaces and abut against them when the exact position has been reached, are provided in a particularly preferred manner in this connection. Other types of mechanical stops are also conceivable here.

A further development of the conveyor device, moreover, includes guide units, wherein the rollers of the conveyor device are at least in part component parts of individual guide units and the rollers of a guide unit include spring-loaded or unsprung or rigid suspensions, wherein the guide units are preferably arranged in the region of a workstation.

The component carrier carriage, driven by the friction surface, interacts with the driven rollers in order to be moved along the conveyor path through the workstations and between the workstations. The driven rollers, in this case, are received in part in guide units, the guide units, which move the component carrier carriage along the conveyor track, running beyond them at least along the conveyor track (X axis). The guide units are provided at least in part with a spring system for the suspension of the rollers so that, on the one hand, a change in the movement plane, formed from the movement direction (X axis) and a transverse axis (Y axis) which is at right angles thereto and lies horizontally, is possible, and, on the other hand, a preloading and contact pressure of the drive rollers on the friction surface is adjustable, the operating force thereof exceeding the weight force of the component carrier carriage with components or component assemblies arranged thereon.

In addition, an advantageous embodiment of the conveyor device provides that positioning along the course of the conveyor track (X direction) is effected by at least one lock pin, wherein the lock pin, in a preferred manner, projecting out of the conveyor track, engages in a positive locking manner in a receiving members on the component carrier carriage.

Such lock pins can catch the component carrier carriage and, as a result of realizing the tip in a corresponding conical manner, move it into a desired position. They are quick to actuate and, where applicable, are able to absorb large forces in the inserted state.

Furthermore, it is provided in a preferred manner that positioning perpendicular to the course of the conveyor track (Z direction) is effected by at least two positioning members, in particular, Z packs on the component carrier carriage interacting with at least two reference members, in particular, two Z stops or Z rollers.

Z positioning, that is to say, the positioning in the perpendicular direction (Z axis), is provided by means of positioning surfaces/positioning packs on the component carrier carriage or at the workstation which interact with reference members on the respectively other component as a result of mechanical abutment.

In a preferred manner, in this case, the positioning members interact by way of an upwardly pointing surface with a downwardly pointing surface or roller of the reference members. This allows for precise positioning in the perpendicular axis (Z direction) in an end position as a result of the interaction between an oppositely situated, downwardly displacing surface pair or a positioning surface with a downwardly displacing roller, in particular, against the action of spring-mounted drive rollers. The positioning is particularly advantageous compared to surface-mounted positioning as lifting moments, e.g. produced by manipulators, are able to be compensated for without the precise position being endangered. The component carrier carriage is held in a clamping manner in the Z direction.

It is provided, furthermore, in a preferred manner that positioning is effected transversely to the course of the conveyor track (Y direction) by at least two lock pins, wherein the lock pins are spaced apart from one another and, in a preferred manner, projecting from the conveyor track, engage in a positive locking manner in a receiving members on the component carrier carriage.

The advantages of lock pins are described above. The component carrier carriage is able to be clearly oriented in the X direction and Y direction by two points with lock pins. These can act on the component carrier carriage simultaneously or consecutively.

It is provided, furthermore, in a preferred manner that positioning is effected transversely to the conveyor track (Y direction) by at least two positioning members, in particular, Y packs on the component carrier carriage interacting with at least two reference members, in particular, two Y stops or Y rollers.

Corresponding to Z positioning, Y positioning can also be effected by corresponding positioning packs which move in against roller surfaces or in roller pairs and consequently produce a precise position in space along the Y axis.

A further embodiment of the conveyor device according to the present invention provides that the positioning of the component carrier carriage relative to the workstation is configured in a positive locking manner along one, preferably two, in particular, three directions in space so that, in particular, the component carrier carriage is prevented from lifting off the conveyor track.

The achievement of positioning members realizing a positive locking closure overall is that the component carrier carriage is held immovably in the workstation and withstands, in particular, forces applied on it by the manipulators, e.g. industrial robots. As a result, precision when processing is further improved and a reduced breakdown or failure rate is achieved.

It is also provided, in particular, that at least three and preferably four positioning and reference members interact for fixing the component carrier carriage in a workstation in the Z direction.

It is also provided, in particular, that at least three and preferably four positioning and reference members interact for fixing the component carrier carriage in a workstation in the Y direction.

It is provided in the present invention, moreover, that the conveyor device has at least one profile, preferably two or more profiles, realized on the conveyor track extending in the longitudinal direction, wherein at least one roller, in a preferred manner a roller arrangement, on the component carrier carriage engages in such a way in a positive locking manner in the profile that a lifting of the component carrier carriage off the conveyor track and/or a lateral offset of the component carrier carriage in relation to the conveyor track is prevented.

A profile, e.g. an extruded profile or a C rail which is encompassed by rollers or in which a roller engages, provides a positive locking closure for the conveying of the component carrier carriage so that tilting or releasing the component carrier carriage is prevented.

In particular, in the case of a spring-loaded roller which presses against the component carrier carriage on its friction surface, particularly, sturdy guiding that is secured against lifting off and tilting is provided by the positive locking reception of at least one roller in a C rail, the roller abutting against the upper flank of the C rail and rolling off when moving.

In a preferred realization, the monorail extends beneath the component carrier carriage, in particular, centrally beneath the component carrier carriage. Realizations are also conceivable, however, where a lateral offset is expedient. In particular, the points to be kept accessible for the manipulators determine the arrangement of the components of the conveyor device.

It is also provided to fit the transfer portion and/or the workstation of the conveyor track with a plurality of hold-down devices, wherein each hold-down device includes a hold-down roller and a roller carrier, wherein the hold-down roller is arranged on a profile of the conveyor track by means of the roller carrier and wherein the hold-down rollers are aligned in such a manner with respect to the rollers of the conveyor track that a component carrier carriage moving along the conveyor track is constantly guidable between multiple hold-down rollers and multiple rollers, wherein it is provided, in particular, that in each case two hold-down devices are arranged opposite one another on the profile of the conveyor track. As a result, it is possible, with little expenditure, even where a drive of the component carrier carriage has unsprung or rigidly mounted rollers, to produce sufficient frictional locking between the component carrier carriage and the rollers so that the component carrier carriage is able to be securely accelerated and braked by means of the driven rollers and is additionally secured against lateral tilting.

It is also provided to fit the hold-down device with a spring, wherein the hold-down roller is pressable by means of the spring in such a manner against a surface of a component carrier carriage moving along the conveyor track that the component carrier carriage is pressed onto the rollers on which the component carrier carriage rests, wherein it is provided, in particular, that the hold-down device comprises a lever and the hold-down roller, by means of the lever on the profile of the conveyor track, is pivotably mounted so as to be pivotable about a pivot axis which extends horizontally in the Y direction (Y) and the spring connects the lever to the profile in such a manner that it generates a torque about the pivot axis and wherein it is also provided, in particular, that two hold-down devices arranged opposite one another are connected in the region of their pivot axis by a connector, wherein the two levers are connected to the connector, in particular, in such a manner that they are pivotable independently of one another about their pivot axes. By using a spring on each hold-down device, tolerances can be compensated for and vibrations damped so that the component carrier carriage is able to move in a calm manner. By using levers as roller carriers, it is possible to generate sufficient forces even with weaker springs so that cost-efficient springs can be used and even replacing the springs is simplified. A design that is more robust, in particular, against torsional forces, is achieved with minimum use of material as a result of connecting oppositely situated hold-down devices.

In addition, it is provided that the conveyor device includes a lock pin device, wherein the lock pin device includes a lock pin realized, in particular, as a sword and a sheath for receiving the lock pin, wherein the sheath is movable transversely to a locking direction (X direction) in particular in the Z direction (Z) from a release position into a locking position in which the lock pin is received by the sheath, wherein it is provided, in particular, that the sheath includes two oppositely situated rolling bodies, wherein it is provided, in particular, that rotational axes of the rolling bodies are arranged in such a manner transversely to the traveling direction (X) that the lock pin is received in a low-friction manner by the sheath when it moves into the locking position, wherein it is provided, in particular, that the lock pin is mounted on a component carrier carriage which is movable along the conveyor track (20). Such a lock pin device can be integrated simply into the profile of the conveyor track. In addition, such a lock pin device can be operated with smaller drive forces as the friction forces are reduced by the rolling bodies.

Finally, it is provided in the case of the conveyor device to fit the conveyor device with at least one coupling device, wherein the coupling device includes at least one coupling piece arranged in one of the workstations of the conveyor device and one counter coupling piece mountable on a component carrier carriage, wherein the coupling piece is movable, in particular, together with a sheath of a lock pin device, in such a manner that the coupling piece is couplable with the counter coupling piece of the component carrier carriage, which is in a work position in the workstation, wherein the coupling device includes, in particular, a media coupling device, by means of which the component carrier carriage is suppliable preferably with compressed air and/or electricity. In this way, with minimum expenditure, additional functions, for which the component carrier carriage requires active components, can be realized on the component carrier carriage in particular in each workstation.

According to the present invention, a component carrier carriage is also provided for an above-described conveyor device. The component carrier carriage includes:

a carrier structure and receiving members for components or component assemblies, wherein the carrier structure includes at least one longitudinal carrier and at least two cross members which protrude laterally beyond the longitudinal carrier, in a preferred manner symmetrically in the manner of a Cross of Lorraine, and wherein the receiving members receive the components or component assemblies, in particular, a car body, positioned clearly relative to the carrier structure.

The component carrier carriage is characterized according to the present invention in that the carrier structure includes a fastening grid in which the cross members are arranged and fastened at a selective position (in a preferred manner in the X direction), and/or the cross members include a fastening grid in which the receiving members are arranged and fastened at a selective position in at least one direction in space (in a preferred manner in the Y direction), in particular, two directions in space (Y and Z directions).

As the components or component assemblies to be constructed can change, in particular, the car body shapes, as a result of model ranges or model maintenance, flexible adaptability of the component carrier carriage to the components or component assemblies to be received is cost-saving. It is particularly advantageous, in this case, that both the X direction and the other directions in space allow for a flexible arrangement of the components of the component carrier carriage. A grid of fastening possibilities gives the system of the component carrier carriage a high level of flexibility and the user a technical advantage as a result of lower conversion costs which otherwise, where applicable, would have to be realized by completely newly designed component carrier carriages.

A preferred embodiment provides that the fastening grid is realized on the carrier structure over at least 60%, in a preferred manner 80% of the length of the carrier structure.

Almost total covering of the necessary arrangements for components or component assemblies to be received, in particular, car bodies, can be provided at the length.

A particular embodiment of the component carrier carriage provides that both at least one receiving member for the components or component assemblies and at least one positioning member for aligning the component carrier carriage relative to the workstation is arranged on at least one cross member.

The combined arrangement of positioning members for the component carrier carriage and receiving members for components or component assemblies to be received reduces the number of cross members and, as a result, releases more space for the application of manipulators, in particular, industrial robots. In particular, furthermore, a more precise, more spatially fixed arrangement of the components or component assemblies is achieved as a result of the above-described clamping, positive locking positioning.

In a further preferred realization, it is provided that the longitudinal carrier is realized in cross section in the manner of an upside down T, in particular, is formed from a hollow profile and a flat profile preferably arranged beneath it, wherein the flat profile protrudes beyond the hollow profile in a preferred manner on both sides and, in particular, in a symmetrical manner and wherein the side of the flat profile situated opposite the hollow profile forms a friction surface or drive surface which is drivable by rollers of a conveyor device.

The drive using a friction surface provides access to a higher dynamic when accelerating and braking the component carrier carriage. Furthermore, almost all drive means can be relocated along the conveyor track using the friction surface. An installation space for, for example, running rollers is not necessary in the region of the support of the component carrier carriage and is available for the attaching of cross members or the like. As a result, the component carrier carriage is more compact and more space for the implementation of the manipulators, in particular, industrial robots, is freed up.

In addition, the present invention proposes a method for operating an above-described conveyor device, wherein a component carrier carriage on a conveyor track moves into a workstation until in a work position to be achieved and, in this case, a plunging takes place from a horizontal transport plane, in which the transport between at least two workstations takes place, into a positioning plane, located beneath the transport plane, in which the processing of the components or component assemblies, in particular, of the car body, is effected on the component carrier carriage.

The plunging according to the present invention into the Z positioning by changing from a transport plane into a positioning plane located beneath it allows for positive locking clamping of the positioning members against spring-loaded drive rollers in guide units, as a result of which lifting up is avoided and, particularly, precise Z positioning is made possible.

A preferred realization of the method is characterized in that the movement dynamic carries out a change between two positioned states in the workstations in less than 12 s, in a preferred manner between 5 s and 10 s, in particular within 6 s.

Entering into a positioning plane, just as into Y positioning, is effected during the movement and does not take up any extra time. The introduction of a lock pin to the X positioning requires approximately between 0.5 s and 1 s and has to take place with the component carrier carriage at a standstill. As a result of positioning in one, preferably two axes in space during the impetus of the movement (braking), a time advantage is achieved in relation to positioning, which is only effected once inside the workstation after successful entry. A shortened clock time allows more temporal space for the processing by manipulators, in particular, industrial robots.

In terms of the present invention, a monorail is to be understood as a conveyor track which, in the longitudinal extent, includes only one profile which is formed from a plurality of profile portions that are strung together. The monorail includes a plurality of rollers mounted on the profile, on which the at least one component carrier carriage rolls. In this connection, it can also be provided that two or more rollers are arranged side by side. As a result of arranging the rollers in a parallel manner, the contact surface to the component carrier carriage can be widened in a simple manner.

BRIEF DESCRIPTION OF THE INVENTION

The present invention is explained in more detail by way of the following exemplary embodiment. The present invention is, however, not limited to the embodiment shown.

Figure 1:
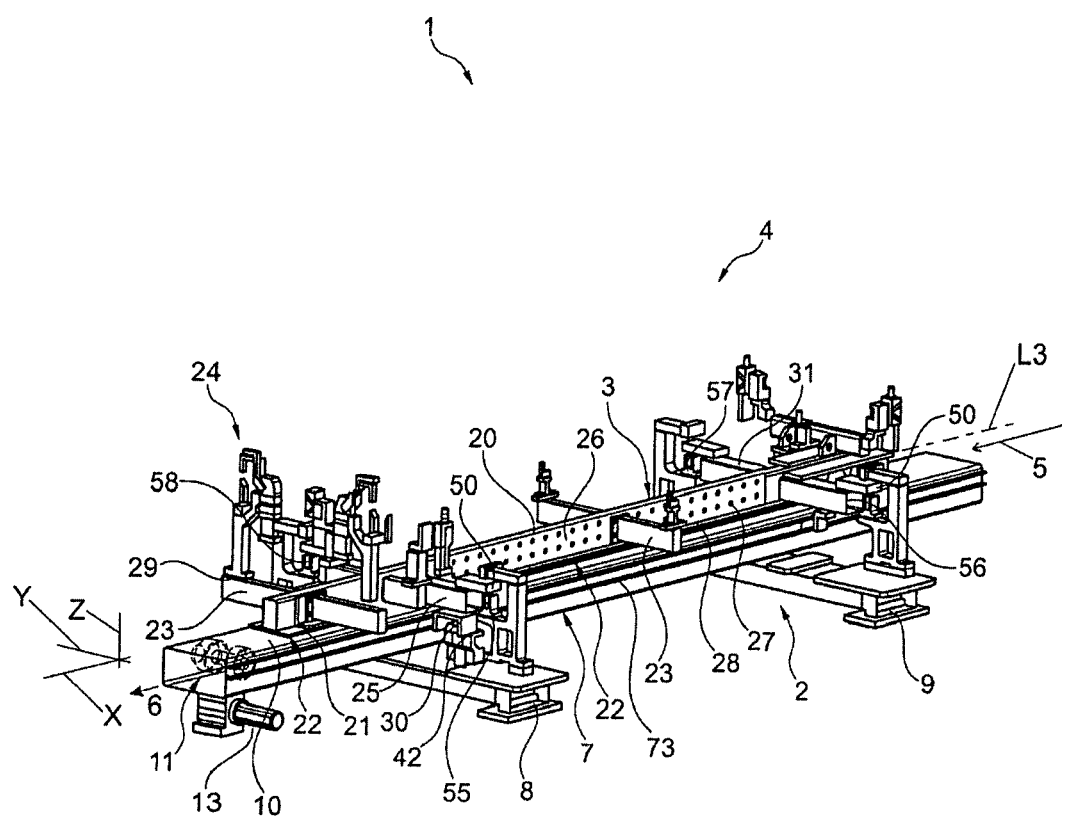
FIG. 1 shows a first realization variant of a conveyor device according to the present invention.
Figure 3A:
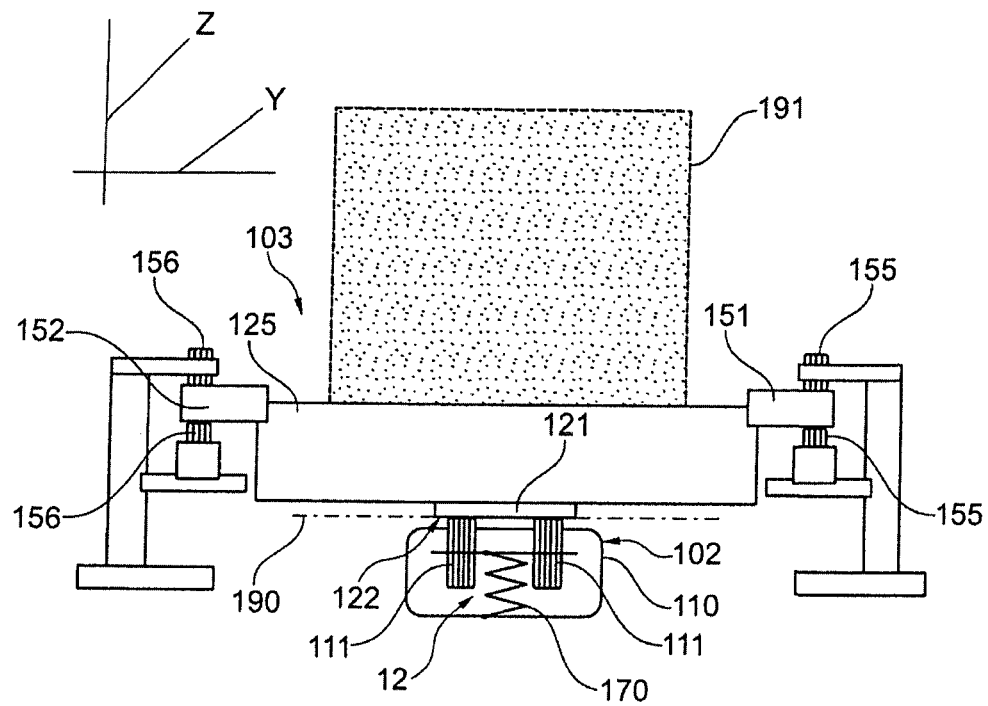
Figure 4:
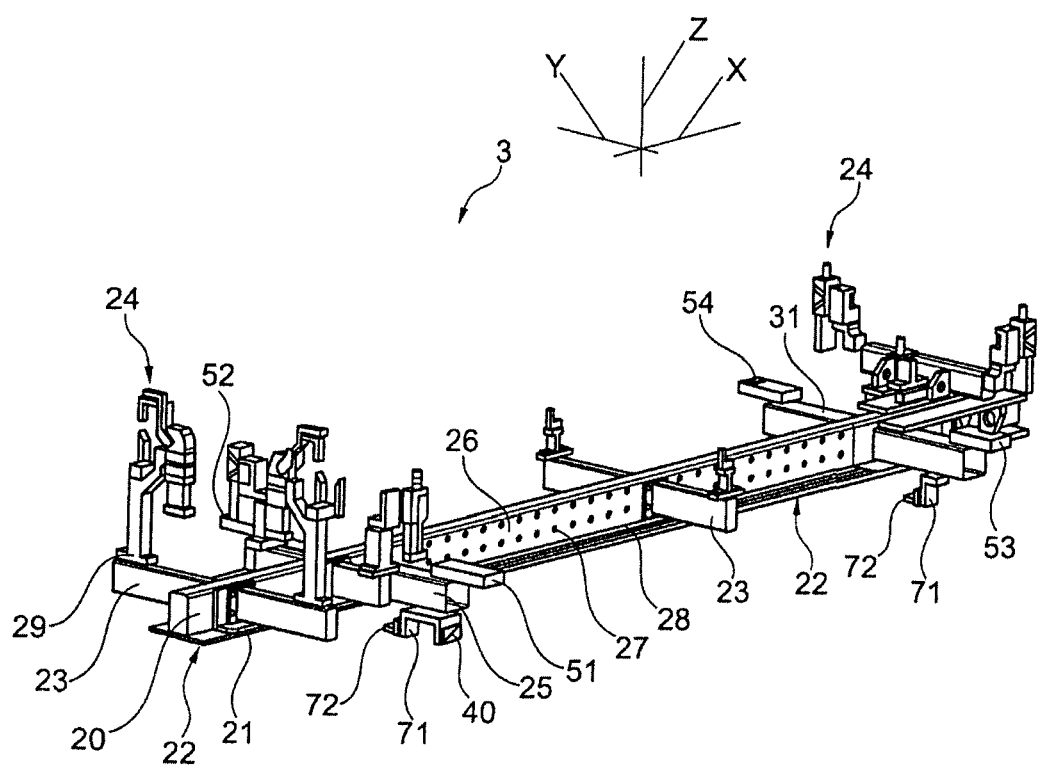
Figure 5:
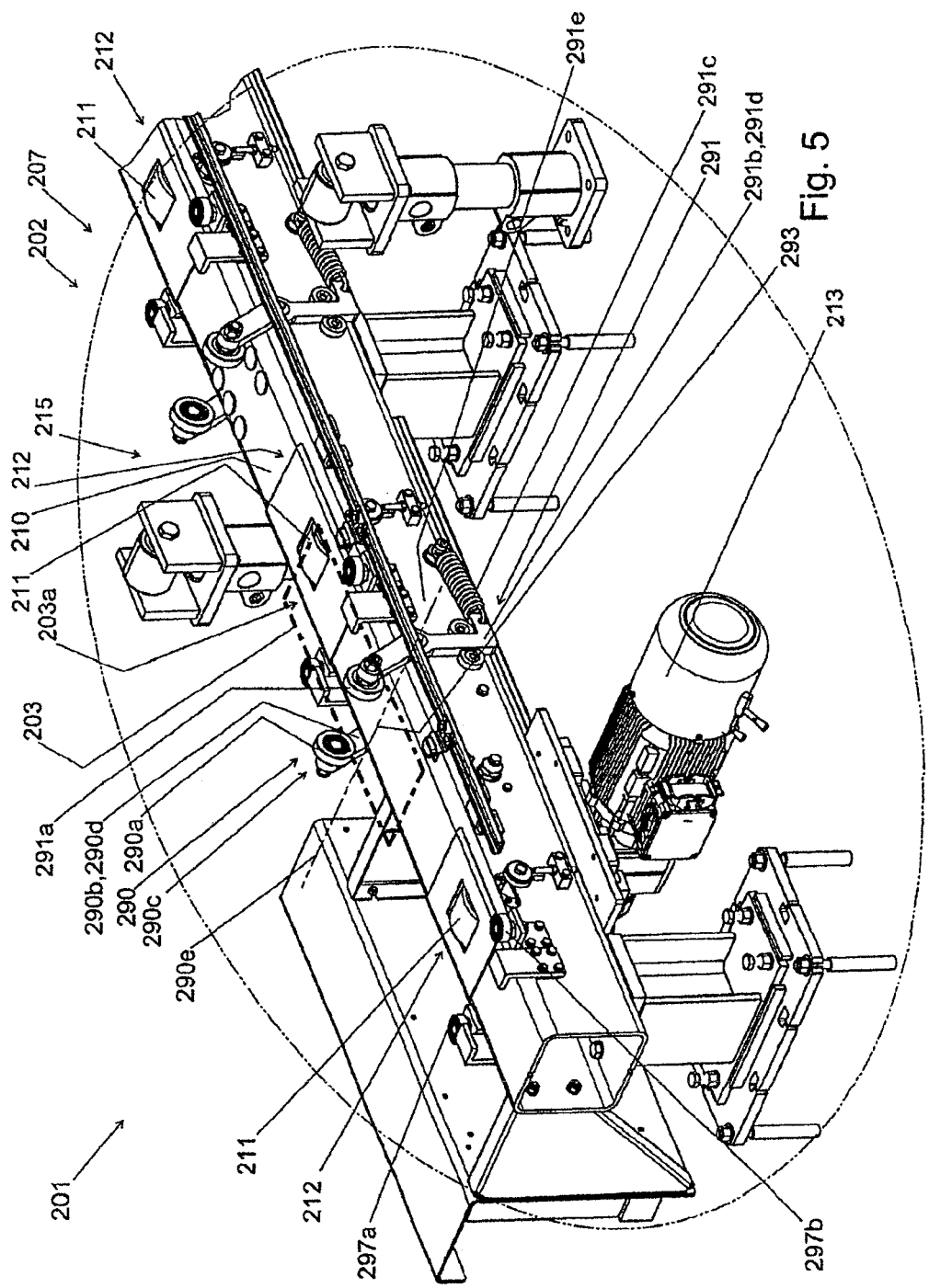
Figure 6:
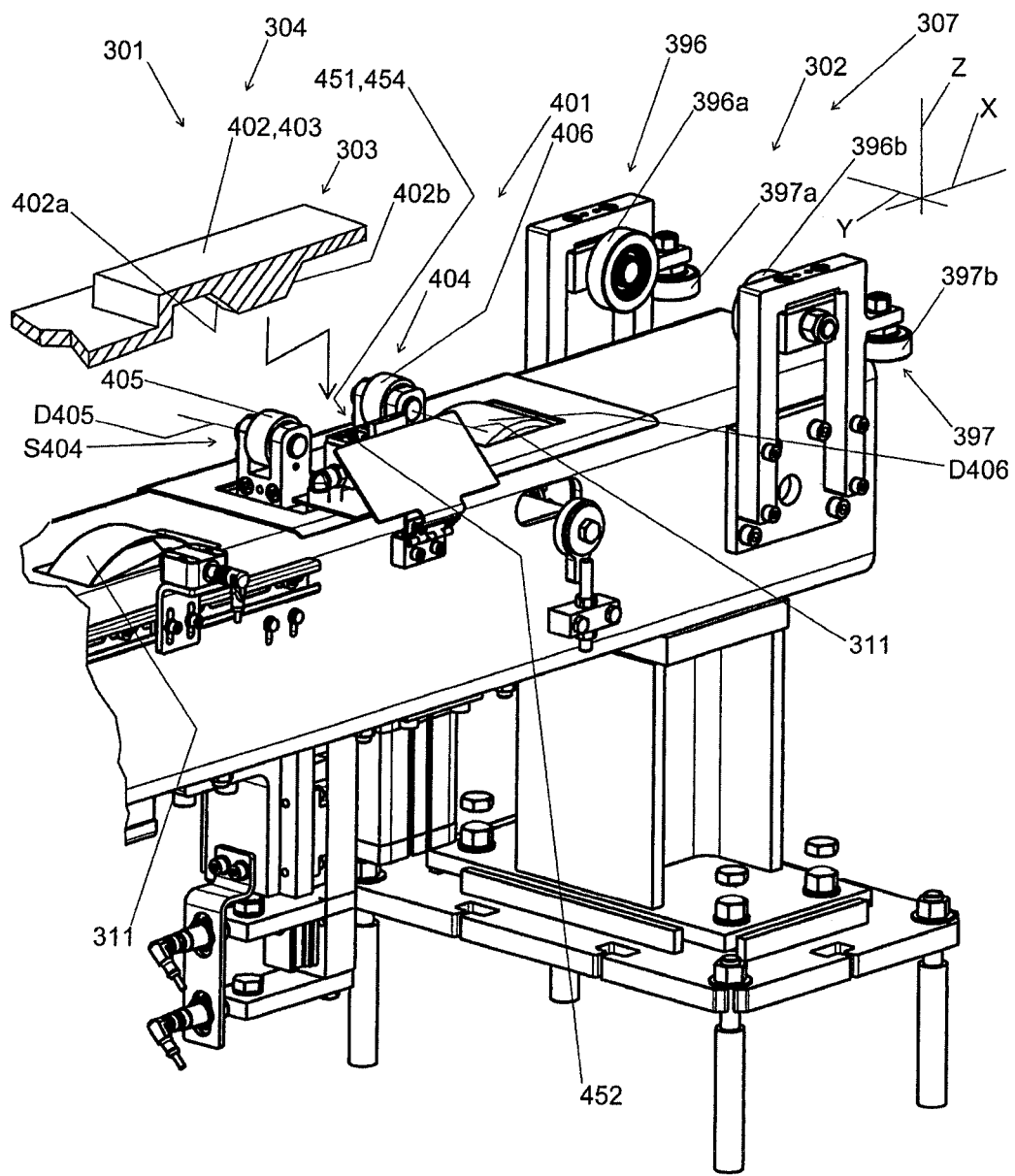

FIG. 3a/b show a schematic sectional representation of the a) positioning plane and b) transport plane;

FIG. 4 shows a perspective representation of the component carrier carriage shown in FIG. 1;

FIG. 5 shows a perspective representation of a detail of a conveyor track of a second realization variant of a conveyor device according to the present invention; and FIG. 6 shows a perspective representation of a detail of a conveyor track of a third realization variant of a conveyor device according to the present invention.

DETAILED DESCRIPTION OF THE INVENTION

In detail, FIG. 1 shows a first realization variant of a conveyor device 1 according to the present invention which includes a conveyor track 2 and a component carrier carriage 3 with a centric longitudinal axis L3. In the present case, the conveyor device 1, which is shown as an example, represents the region of a workstation 4 in the course of a production line. The component carrier carriages 3 are introduced into the region of the workstation 4 from the running direction 5 and leave the workstation, in turn, in the direction of the continued course 6 of the production line.

The conveyor track 2 is realized in the present case as a monorail 7. It includes a profile 10, which is arranged on supports 8, 9 and in which rollers or roller pairs 11 are arranged spaced apart from one another, the roller pairs 11 are received at least in part in guide units 12 with spring-loaded suspension. The rollers or roller pairs 11 are driven rotatingly via a drive 13 in order to move the component carrier carriage 3 dynamically along the conveyor track 2. The profile 10 includes, in dependence on a length and a course of the conveyor track 2, a plurality of profile portions strung together.

The component carrier carriage 3 includes, in turn, a centrally arranged hollow profile 20 which is attached on its underside to a flat profile 21. The flat profile 21 realizes on its underside a friction surface 22 which enables the component carrier carriage 3 to move dynamically in interaction with the rollers or roller pairs 11 and the drive 13. Corresponding guide units 12 (see FIG. 3a) with spring-mounted driven rollers or roller pairs 11 are arranged at regular intervals along the conveyor track 2 in order always to ensure drivability of the component carrier carriage 3.

The component carrier carriage 3 additionally includes cross members 23, 25, which carry, in turn, receiving members 24 for components or component assemblies, in particular, a body of a vehicle which is not shown. Part of the cross members, namely the cross members 25 also include, along with receiving members 24, positioning members 30 which are provided in the present case on the front, left-hand portion of the component carrier carriage 3 in the direction of movement for positioning along the Y axis.

A fastening grid 26, in the present case formed from regular threaded bores 27 for the fastening of the cross member 23, is provided along the flat profile 21. A further fastening grid 28 can be provided on the flat profile 21 also with threaded bores either directly in the flat profile 21 or by means of corresponding additional components, such as, for example, angled elements. The cross members 23 are able to be converted in this way, flexibly positioned and adapted to the component or the component assemblies to be received. The cross members 23 also include corresponding receiving members 29, e.g. in the form of clamping profiles, for flexibly positioning and fixing the receiving members 24.

When the component carrier carriage 3 enters into the region of the workstations 4 from the running direction 5 of the production line, it reaches the working position shown in FIG. 1. In this case, the positioning members engage in corresponding reference members, which are described in more detail below.

Positioning members 30 are provided on the front cross member 25 on the left-hand side in the direction of travel for positioning horizontally transversely to the running direction 5, 6 of the production line, consequently for positioning along the Y axis. Corresponding Y positioning members, which, in the present case, are concealed by the representation, are provided on the rear cross member 31 on the right-hand side in the direction of travel. The Y positioning members are formed by so-called Y packs 40, 41 (see FIGS. 2 and 4, in particular) which move into Y reference rollers 42, 43 with vertically free-standing rotational axes and are received there precisely, in a positive locking manner in the Y direction. The Y position of the component carrier carriage 3 is determined as a result of the two reference roller pairs, namely Y reference rollers 42 (front left) and Y reference rollers 43 (rear right). The Y reference rollers 42 and the Y reference rollers 43 each form Y reference members 44.

According to a realization variant, as an alternative to the described diagonal arrangement of the reference roller pairs, an arrangement that is offset one behind another on a left or right side of the profile 10 is also provided.

In a corresponding manner, Z positioning members, which determine the position in the perpendicular axis, also move into corresponding reference members. The Z positioning members 50 in the form of Z packs 51-54 (see FIG. 4, in particular) are arranged with positioning members on cross members 25 in the region of the four corners of the component carrier carriage 3. The Z packs 51-54 move into corresponding Z rollers 55-58 (see FIG. 1, in particular) and are also held in a positive locking manner in the Z direction by the Z reference members 60 (see FIG. 2, in particular), formed by the respective Z rollers.

Figure 2:
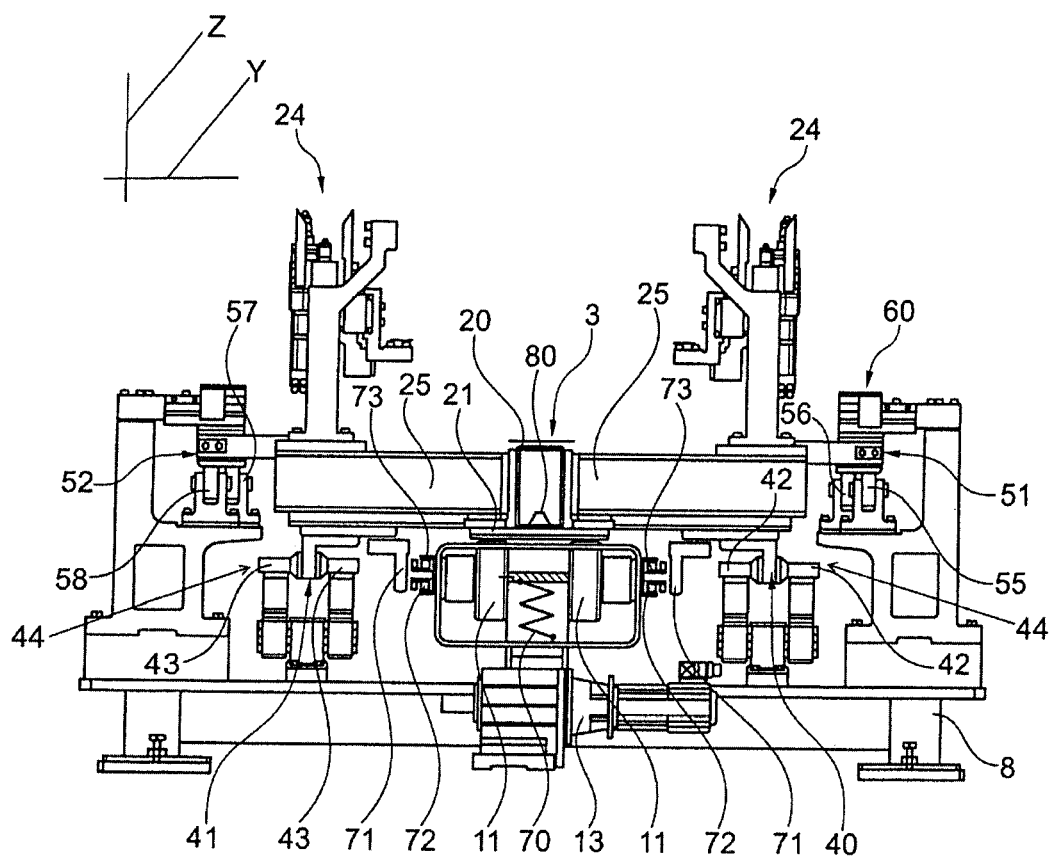
FIG. 2 shows a schematic partial section through the conveyor device according to the present invention shown in FIG. 1 along the Y-Z plane.

The interaction between the positioning members and the reference members are explained in more detail in FIG. 2. In this case, it can be seen that the Z positioning packs 51-54 are each at an offset in the Y direction to one another on one side so that the respective Z reference members are able to pass through when the component carrier carriage 3 moves through the region of the workstation 4.

The rollers or the roller pair 11 is driven by the drive 13 and is spring-loaded by means of a spring system 70 (shown as an example). The component carrier carriage 3 rests with the flat profile 21 on the running surface of the rollers or roller pairs 11 and is moved dynamically by means of the same. Rollers 72, which engage in C profile rails 73 at the side of the conveyor track 2, are arranged on the component carrier carriage 3 by means of angled profiles 71. As a result of engagement on both sides, there is positive locking closure in the Y and Z directions which prevents, in particular, the component carrier carriage 3 from tilting and lifting off the conveyor track 2.

The positioning in the X direction is effected via a lock pin 80 which is movable out of the conveyor track 2 and engages in a corresponding bore on the underside of the component carrier carriage 3. A conically formed tip of the lock pin 80 allows, in this connection, for a certain self-centering with respect to positioning in the X direction.

In place of the protection against lifting-off and tilting by means of rollers 72 engaging in a C profile 73, it is also possible to encompass a strip or a differently formed profile with multiple rollers (not shown in the present case) in such a manner that only movement in the X direction is made possible. This is shown as an example on a conveyor track 302 shown in FIG. 6 by two oppositely situated Z locking rollers 396a, 396b and two oppositely situated Y locking rollers 397a, 397b. As a result of the locking rollers each forming one roller pair 396, 397, a component carrier carriage 303, only shown schematically, is secured at a standstill and in movement against lifting off the conveyor track 302 and against lateral tilting in relation to the conveyor track 302. Further such roller pairs are obviously arranged in the longitudinal extent (X direction) of the conveyor track 302 so that the component carrier carriage 303 is secured along its entire path. Independently of said protection against lifting-off and tilting, positioning of the component carrier carriage 303 is effected in each workstation 304 by Z reference members and Y reference members, not visible in FIG. 6, which interact with Z positioning members and Y positioning members of the component carrier carriage 303. This is carried out in a manner comparable to FIGS. 1 to 4. The component carrier carriage 303 is positioned in the workstation 304 in such a manner that it is spaced apart from the Z locking rollers 396a, 396b and from the Y locking rollers 397a, 397b. Contact with the Z locking rollers 396a, 396b and with the Y locking rollers 397a, 397b is only possible when the component carrier carriage 303 is situated in a transport plane and not in a positioning plane.

Figure 3B:
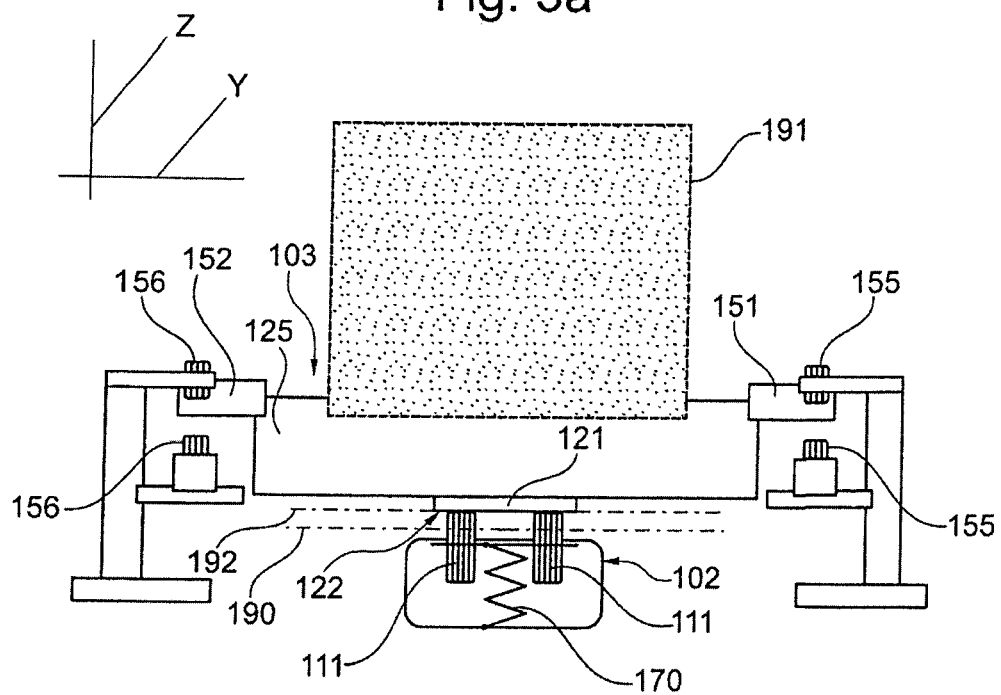

FIGS. 3a and 3b show a schematic representation of the change in the positioned state of the conveyor device 1 according to the present invention into the transport state. In this connection, the reference symbols are used analogously to the reference symbols used in FIGS. 1, 2 and 4 but are raised in each case by 100.

The component carrier carriage 103 is positioned in FIG. 3a in the region of a workstation. The drive rollers 111 in the profile 110 of the conveyor track 102 are pressed against the spring system 170 by the component carrier carriage 103, in particular, the flat profile 121, in such a manner that the friction surface 122 is arranged on a positioning plane 190. The pressing is achieved as a result of the Z positioning packs 151, 152 arranged on the cross members 125 moving into the Z reference rollers 155, 156, which are formed in the present case by a roller at the bottom and a roller at the top. In this way, the Z position is clearly defined so that the processing of a component assembly 191, in particular, of a car body (shown schematically), is able to be effected by industrial robots.

FIG. 3b shows the transport state in a corresponding manner, where the Z positioning packs 151, 152 have not yet been moved into the Z reference rollers 155, 156. The drive roller pair 111 is arranged by the spring system 170 in a position projecting higher up so that the underside of the friction surface 122 is guided in a transport plane 192 above the positioning plane 190.

For positioning the component carrier carriage in the region of a workstation in the Z direction, it consequently plunges from a higher transport plane 192 into a positioning plane 190 located beneath it.

FIG. 4 once again shows the component carrier carriage 3 according to the present invention shown in FIG. 1. Reference is made to the description in FIG. 1, corresponding components have identical reference symbols.

FIG. 5 shows a perspective representation of a detail of a conveyor track 202 of a second realization variant of a conveyor device 201 which is realized as a monorail 207. The conveyor track 202 is shown in the region of a transfer portion 215 and includes a plurality of hold-down devices 290, 291, only two of which are described and designated here as an example. The transfer portion 215 is realized between workstations and is used in comparable design in particular also as a transport station or a blank station or bridging station. Each hold-down device 290, 291 includes a hold-down roller 290a, 291a and a roller carrier 290b, 291b, the hold-down roller 290a, 291a being arranged by means of the roller carrier 290b, 291b on a profile 210 which extends along a course of the conveyor track 202 and the hold-down rollers 290a, 291a being aligned in such a manner on rollers 211 of the conveyor track 202 that a component carrier carriage 201 moving along the conveyor track 202 and indicated schematically is constantly guidable between multiple hold-down rollers 290a, 291a and multiple rollers 211. In this connection, two hold-down devices 290, 291 are arranged on the profile 210 of the conveyor track 201 in each case situated opposite one another. The rollers 211 of the transfer portion are received in guide units 212 in a rigid and unsprung manner in contrast to the rollers 211 of the workstations shown in the preceding figures. The rollers 211 are driven via a drive 213, a propelling means, which is not shown and includes, in particular, a toothed belt or a chain, connecting the drive 213 and the rollers 211 in the profile 210.

The hold-down device 290, 291 also includes a spring 290c, 291c, a hold-down roller 290a, 291a being pressable by means of the spring 290c, 291c in such a manner against a surface 203a of the component carrier carriage 203 moving along the conveyor track (shown schematically) that the component carrier carriage 203 is pressed onto the rollers 211, on which it rests, so that a sufficient frictional locking connection is ensured. The hold-down device 290, 291 additionally includes a lever 290d, 291d, the hold-down roller 290a, 291a being pivotably mounted on the profile 210 of the conveyor track 201 by means of the lever 290d, 291d so as to be pivotable about a pivot axis 290e, 291e which extends horizontally in the Y direction and the spring 290c, 291c connecting the lever 290d, 291d to the profile 210 in such a manner that they generate a torque about the pivot axes 290e, 291e, by means of which the hold-down rollers 290a, 291a are pressed onto the component carrier carriage 203. In this connection, the levers 290d, 291d are realized as toggle levers.

The hold-down devices 290, 291, which are described as an example, are also arranged opposite one another in pairs, just as further hold-down devices that are not described, and are connected in the region of their pivot axes 290e, 291e by a connector 293 which extends through the profile 211, the two levers 290d, 291d being connected to the connector 293, in particular, in such a manner that they are pivotable about their pivot axes 290e, 291e independently of one another.

As a result of the Y locking rollers 297a, 297b being arranged laterally on the profile 210 and opposite one another, the component carrier carriage 203 is also guided laterally so that it is ensured that it follows the progression of the profile 211 of the transfer portion 215. In this connection, a plurality of oppositely situated Y locking rollers are arranged over the course of the profile 211 so that the component carrier carriage 203 is secured along its entire path.

FIG. 6 shows a perspective representation of a detail of the already mentioned conveyor track 302, which is realized as a monorail 307, of a third realization variant of a conveyor device 301, a lock pin device 401, which is described below, also being able to be installed in a workstation or a transfer portion of one of the conveyor devices shown in FIG. 1 to 4 or 5. The conveyor device 301 represents, in the present case, the region of a workstation 304 in the course of a production line and is provided there with spring-loaded or pressure-loaded rollers 311. The conveyor track 302 of the conveyor device 301 includes the mentioned lock pin device 401, the lock pin device 401 including a lock pin 403, realized as a sword 402, and a sheath 404 for receiving the lock pin 403. In this connection, the lock pin 403 is fastened on the component carrier carriage 303 of the conveyor device 301, which is only shown schematically and at a spacing from the conveyor track 302. The sheath 404 is movable transversely to a blocking direction (X direction) in the Z direction from a release position, not shown, in which the sword 402 and consequently the component carrier carriage 303 is freely movable in the blocking direction (X direction), upward into a blocking position S404 shown. In the blocking position S404, the sword 402 is then—as symbolized by an arrow—received by the sheath 404. The sheath 404 includes two oppositely arranged rolling bodies 405, 406, rotational axes D405, D406 of the rolling bodies 405, 406 being arranged in such a manner transversely to the blocking direction (X direction) or transversely to the direction of travel (X direction) that the sword 402 is centered with its back surface 402a, 402b in a low-friction manner on the sheath 404 when it moves out of the profile 310 upward into the blocking position S404 in order to position the component carrier carriage 303 in the X direction.

As an option, the conveyor device 301 also includes at least one coupling device 451, the coupling device 451 including at least one coupling piece 452, arranged in one of the workstations of the conveyor device 301, and one counter coupling piece (not shown) which is mountable on the component carrier carriage 303, the coupling piece 452 being movable together with the sheath 404 of the lock pin device 401 in such a manner that the coupling piece 452 is couplable with the counter coupling piece of the component carrier carriage 303 which is in the working position in the workstation, the coupling device 451 including a media coupling device 454, by means of which the component carrier carriage 303 is preferably suppliable with compressed air and/or electricity.

LIST OF REFERENCES

1 Conveyor device
2 Conveyor track
3 Component carrier carriage
L3 Longitudinal axis of 3
4 Workstation
5 Running direction
6 Running direction
7 Monorail 7
8, 9 Support of 10 of 7
10 Profile of 7
11 Spring-loaded rollers or roller pair of 7

12 Guide units
13 Drive
20 Centrally arranged hollow profile of 3
21 Flat profile of 3
22 Friction surface of 21
23 Cross member of 3
24 Receiving members of 3 on 23
25 Cross member
26 Fastening grid of 3 on 21
27 Threaded bores of 26
28 Further fastening grid
29 Receiving members of 23
30 Positioning members of 3 on 25
31 Rear right-hand cross member
40, 41 Y pack as positioning members 30
42 Reference roller pair (front left) of 4
43 Reference roller pair (rear right) of 4
44 Y reference members formed by 42 or 43
50 Z positioning members of 3 on 25
51-54 Z packs as Z positioning members 50
55-58 Z roller of 4
60 Z reference members as Z rollers 55-58
70 Spring system of 11
71 Angled profile
72 Roller of 3
73 C profile rail of 2
80 Lock pin
102 Conveyor track
103 Component carrier carriage
110 Profile
111 Spring-loaded drive roller/roller
121 Flat profile
122 Friction surface
125 Cross member
170 Spring system
151, 152 Z positioning pack of 103
155, 156 Z reference roller
190 Plane/positioning plane
191 Component assembly
192 Transport plane
201 Conveyor device
202 Conveyor track
203 Component carrier carriage
203a Surface of
207 Monorail
210 Profile
211 Rigid rollers
212 Guide units
213 Drive
215 Transfer portion
290, 291 Hold-down device
290a, 291a Hold-down roller
290b, 291b Roller carrier
290c, 291c Spring
290d, 291d Lever
290e, 291e Pivot axis of 290d, 291d
293 Connector of 290 and 291
297a, 297b Y locking rollers
301 Conveyor device
302 Conveyor track
303 Component carrier carriage
304 Workstation
307 Monorail
310 Profile
311 Spring-loaded roller
396 Roller pair
396a, 396b Z locking roller
397 Roller pair
397a, 397b Y locking roller
401 Lock pin device
402 Sword
402a, 402b Back surface
403 Lock pin
404 Sheath
405, 406 Rolling body
D405, D406 Rotational axes of the rolling bodies
S404 Locking position
451 Coupling device
452 Coupling piece
454 Media coupling device

The invention claimed is:

1. A conveyor device for an automated production line comprising:
at least one conveyor track along a course of the production line;
at least one component carrier carriage for transporting components or component assemblies on the production line;
wherein the production line includes transfer portions and workstations that are run through by the conveyor track along the course of the production line;
wherein the conveyor track is configured as a monorail;
wherein the conveyor track comprises a plurality of spring-loaded rollers, which are driven at least in part by drives, such that the spring-loaded rollers are configured to move the component carrier carriage from a transport plane to a positioning plane, which is different from the transport plane, in a region of at least one of the workstations; and
wherein the component carrier carriage includes at least one friction surface, by which the component carrier carriage is drivable by the spring-loaded rollers of the conveyor track.

2. The conveyor device as claimed in claim 1, further comprising positioning members on the component carrier carriage, and reference members on the conveyor track at least in the region of the at least one of the workstations,
wherein the positioning members on the component carrier carriage and the reference members of the conveyor track interact in such a manner that the component carrier carriage is positioned in a working position, in which the processing of the components or component assemblies is provided by at least one manipulator, relative to the workstation in at least one direction.

3. The conveyor device as claimed in claim 2, further comprising guide units, wherein the spring-loaded rollers of the conveyor device are at least in part component parts of the individual guide units and wherein at least one of the guide units are arranged in the region of the workstation.

4. The conveyor device as claimed in claim 2, wherein positioning along the course of the conveyor track (X direction) is effected by at least one lock pin projecting out of the conveyor track to engage in a positive locking manner a receiving member on the component carrier carriage and/or
positioning perpendicular to the course of the conveyor track (Z direction) is effected by at least two of the positioning members on the component carrier carriage interacting with at least two of the reference members,
wherein the positioning members interact by way of an upwardly pointing surface with a downwardly pointing surface or roller of the reference members and/or positioning is effected transversely to the course of the conveyor track (Y direction) by at least two lock pins spaced apart from one another and projecting from the conveyor track to engage in a positive locking manner in a receiving member on the component carrier carriage, and/or positioning is effected transversely to the conveyor track (Y direction) by at least two of the positioning members on the component carrier carriage interacting with at least two of the reference members.

5. The conveyor device as claimed in claim 2, wherein the positioning of the component carrier carriage relative to the workstation is realized in a positive locking manner along at least one direction so that the component carrier carriage is prevented from lifting off the conveyor track.

6. The conveyor device as claimed in claim 1, further comprising at least one profile on the conveyor track extending in the longitudinal direction, wherein at least one roller on the component carrier carriage engages in a positive locking manner in the profile so that a lifting of the component carrier carriage from the conveyor track and/or a lateral offset of the component carrier carriage in relation to the conveyor track is prevented.

7. The conveyor device as claimed in claim 1, wherein the transfer portions and/or the workstations of the conveyor track includes a plurality of hold-down devices, wherein each of the hold-down devices includes a hold-down roller and a roller carrier, wherein the hold-down roller is arranged on a profile of the conveyor track by the roller carrier and wherein the hold-down rollers are aligned in such a manner with respect to the spring-loaded rollers of the conveyor track that the component carrier carriage moving along the conveyor track is constantly guidable between at least two of the hold-down rollers and at least two of the spring-loaded rollers, wherein two of the hold-down devices are arranged opposite one another on the profile of the conveyor track.

8. The conveyor device as claimed in claim 7, wherein each of the hold-down devices includes a spring, wherein the hold-down roller is pressable by the spring in such a manner against a surface of the component carrier carriage moving along the conveyor track that the component carrier carriage is pressed onto the spring-loaded rollers on which the component carrier carriage rests, wherein each of the hold-down devices comprises a lever and the hold-down roller is pivotably mounted by the lever on the profile of the conveyor track so as to be pivotable about a pivot axis which extends horizontally in the Y direction and the spring connects the lever to the profile in such a manner that the spring generates a torque about the pivot axis and wherein two of the hold-down devices arranged opposite one another are connected in the region of their pivot axes by a connector, wherein the two levers are connected to the connector in such a manner that they are pivotable independently of one another about their pivot axes.

9. The conveyor device as claimed in claim 1, wherein the conveyor device includes a lock pin device having a lock pin as a sword and a sheath for receiving the lock pin, wherein the sheath is movable transversely to a locking direction from a release position into a locking position in which the lock pin is received by the sheath, wherein the sheath includes two oppositely arranged rolling bodies, wherein rotational axes of the rolling bodies are arranged in such a manner transversely to the traveling direction that the lock pin is received in a low-friction manner by the sheath when the lock pin moves into the locking position, wherein the lock pin is mountable on tithe component carrier carriage which is movable along the conveyor track.

10. The conveyor device as claimed in claim 1, wherein the conveyor device includes at least one coupling device having at least one coupling piece arranged in one of the workstations of the conveyor device and one counter coupling piece mountable on the component carrier carriage, wherein the coupling piece is movable together with a sheath of a lock pin device in such a manner that the coupling piece is couplable with the counter coupling piece of the component carrier carriage which is in a work position in the workstation, wherein the coupling device includes a media coupling device, by which the component carrier carriage is suppliable with compressed air and/or electricity.

11. A component carrier carriage for a conveyor device as claimed in claim 1 further comprising:

a carrier structure and a receiving member for components or component assemblies, wherein the carrier structure includes at least one longitudinal carrier, which has sides extending in a longitudinal direction, and at least two cross members which protrude laterally beyond the longitudinal carrier such that the at least two cross members are spaced apart from one another symmetrically along each side of the longitudinal carrier, wherein the receiving member receives the components or component assemblies positioned relative to the carrier structure, wherein the carrier structure includes a fastening grid in which the cross members are arranged and fastened at a selective position, and/or the cross members include a fastening grid in which the receiving member is arranged and fastened at a selective position in at least one direction.

12. The component carrier carriage as claimed in claim 11, wherein the fastening grid is provided on the carrier structure over at least 60% of the length of the carrier structure.

13. The component carrier carriage as claimed in claim 11, wherein both the receiving member for the components or component assemblies and at least one positioning member for aligning the component carrier carriage relative to the workstation is arranged on at least one of the cross members.

14. The component carrier carriage as claimed in claim 11, wherein the longitudinal carrier is realized in cross section in the manner of an upside down T including a hollow profile and a flat profile arranged beneath the hollow profile, wherein the flat profile protrudes beyond the hollow profile on both sides and in a symmetrical manner and wherein the side of the flat profile situated opposite the hollow profile forms a friction surface or drive surface which is drivable by the spring-loaded rollers of the conveyor device.

15. A method for operating a conveyor device as claimed in claim 1, further comprising the component carrier carriage on the conveyor track moving into a one of the workstations until in a work position to be achieved and, in this case, plunging takes place from the transport plane, which is a horizontal plane, in which the transport between at least two of the workstations takes place, into the positioning plane, located beneath the transport plane, in which the processing of the components or component assemblies is effected on the component carrier carriage.

16. The method as claimed in claim 15, wherein movement of the component carrier carriage carries out a change between two positioned states in the workstations in less than 12 seconds.

17. The conveyor device as claimed in claim 1, wherein the monorail extends along a central longitudinal axis of the component carrier carriage.

18. The conveyor device as claimed in claim 1, wherein the component carrier carriage includes at least one friction surface by which the component carrier carriage is movable dynamically along the conveyor track.

19. The conveyor device as claimed in claim 4, wherein when the positioning is in the Z direction the at least two positioning members are Z packs and the at least two reference members are Z stops or Z rollers, and when the positioning is in the Y direction, the at least two positioning members are Y packs and the at least two reference members are Y stops or Y rollers.

20. The conveyor device as claimed in claim 6, wherein the at least one profile includes two or more profiles and the at least one roller is a roller arrangement.

\* \* \* \* \*